United States Patent [19]

Lee et al.

[11] 3,843,827

[45] Oct. 22, 1974

[54] PROCESS FOR BAKING FOODSTUFFS

[75] Inventors: Charleston Roy Lee, Bethel, Conn.; Dorothy Mary King, Irvington; Edward Einar Clausen, Peekskill, both of N.Y.

[73] Assignee: General Foods Corporation, White Plains, N.Y.

[22] Filed: Feb. 22, 1972

[21] Appl. No.: 228,337

[52] U.S. Cl................ 426/293, 426/296, 426/302, 426/343, 426/375
[51] Int. Cl........ A23b 1/10, A23b 3/14, A23b 7/16
[58] Field of Search ......... 99/1, 100, 107, 111, 168, 99/169, 192, 194; 426/293, 296, 302, 343, 375

[56] References Cited
UNITED STATES PATENTS

| | | | |
|---|---|---|---|
| 2,910,370 | 10/1959 | Rogers | 99/194 |
| 3,052,545 | 9/1962 | Duehoime | 99/1 |
| 3,078,172 | 2/1963 | Libby | 99/192 |
| 3,169,069 | 2/1965 | Hanson | 99/194 |
| 3,208,851 | 9/1965 | Antinon | 99/1 |
| 3,514,294 | 5/1970 | Klug | 99/1 |
| 3,586,512 | 6/1971 | Manucuso | 99/100 |
| 3,656,969 | 4/1972 | Horn | 99/100 |
| 3,669,674 | 6/1972 | Klug | 99/1 |

*Primary Examiner*—Wilbur L. Bascomb, Jr.
*Assistant Examiner*—Martin G. Mullen
*Attorney, Agent, or Firm*—Thomas V. Sullivan; Bruno P. Struzzi

[57] ABSTRACT

A process is provided for simulating the texture and appearance of deep fat-frying to foodstuffs without the need for deep fat frying itself.

The foodstuff to be baked is first coated with a batter containing specific ingredients, particularly wheat flour. The batter-coated foodstuff is then coated with a dry mixture comprising cereal fines, starch, flour, and fat. The foodstuff is then baked until done. The result is a foodstuff with the texture and appearance of a foodstuff which has been batter-coated and then deep-fat fried.

2 Claims, No Drawings

PROCESS FOR BAKING FOODSTUFFS

BACKGROUND OF THE INVENTION

There has always been a great consumer acceptance for fried foodstuffs, particularly meats such as chicken, pork and the like. These foods are usually prepared by coating them in a batter and/or a dry mix, such as breading and subsequently fat frying the foodstuff. Southern fried chicken is particularly popular and is prepared by batter-coating the chicken and deep fat-frying the coated chicken. A cleaner more economical method for producing a foodstuff with a fried texture is provided by the process of this invention. The process eliminates the necessity for deep fat-frying along with the equipment and ingredients therefor. The foodstuff is cooked solely by a baking step, and the fat-fried texture and appearance is provided by the ingredients and the coatings applied to the foodstuff before baking.

SUMMARY OF THE INVENTION

It is the principal object of this invention to provide a process for producing cooked foodstuffs with a fat-fried texture and appearance without the need for fat-frying the foodstuff. It is a further object of this invention to achieve the above result with the use of a baking step as the sole cooking step for the foodstuff. These and other objects are achieved as more fully described below.

Generally speaking the process of this invention is carried out as follows: the foodstuff to be cooked, meat, fish or vegetable, is evenly coated with a batter comprising raw egg, milk or water, wheat flour, shortening, corn starch and pregelatinized waxy maize starch; the batter-coated foodstuff is then rolled in, or otherwise coated with, a dry mix comprising cereal fines, pre-gelatinized waxy maize starch, shortening and wheat flour; the coated foodstuff is then baked in an oven until cooked. The final product possesses a deep fat-fried texture and appearance.

DETAILED DESCRIPTION OF THE INVENTION

The types of foodstuffs to which this process can be applied are, generally speaking, meat, fish or vegetables. The process may be particularly applied to meats such as chicken and pork. The batter is formed by combining approximately 80–100 grams of a dry mix comprising wheat flour, shortening, corn starch, pregelatinized waxy maize starch, and optional flavoring agents, such as sugar and spices, with raw egg and approximately 2½ to 3½ ounces of milk or water. The foodstuff is preferably cut up into easily handled sizes and is dipped into or coated with the batter. The batter ingredients each funtion together in a critical way to produce a batter which will coat foodstuff uniformly and produce a crisp, fried-like texture base upon baking of the foodstuff. The flour is the basic coating ingredient, the shortening acts as a lubricant and flavoring agent, the starches act as thickeners and the egg helps to emulsify the batter for better coating. The preferred ranges for the dry mix batter ingredients based on the total weight of the dry mix are as follows: wheat flour 60 percent–75 percent; shortening 7 percent–12 percent; corn starch 7 percent–12 percent; pregelatinized waxy maize starch 1.5 percent–3 percent; and flavoring agents 0 percent–20 percent.

After the foodstuff has been coated with the batter as just described, it is further coated with a second dry mix comprising, by weight of said second mix, 35 percent–50 percent cereal fines, 15 percent–25 percent of a pre-gelatinized modified waxy maize starch, 3 percent–15 percent shortening, 10 percent–15 percent wheat flour, 0 percent–15 percent flavoring agents and 0 percent–1 percent coloring. Again the ingredients of this second dry mix function together critically to produce the desired results of a fat-fried texture to the baked foodstuff. The cereal fines, waxy maize starch, and wheat flour all function together to produce the desired fat-fried texture, and, as before, the shortening acts as a lubricant and flavoring agent. Spices, flavoring agents and colors may be added as desired.

After this second coating step, the coated foodstuff is then placed in an oven and baked until done. A coated foodstuff with a thick, crisp fat-fried texture and appearance results.

EXAMPLE I

A batter is formed by combining one raw egg and one-third cup of milk with 87 grams of a dry mix consisting of the following by weight of the dry mix: wheat flour 71.3 percent; shortening 9.7 percent; cornstarch 9.2 percent; sugar 5.4 percent; and spice blend 4.4 percent. Two and one half pounds of cut-up chicken pieces are coated evenly with the batter, and the chicken pieces are then further coated with 85 grams of a second dry mix consisting of the following by weight of the dry mix: cereal fines 41.0 percent; pre-gelatinized waxy maize starch 20.1 percent; shortening 13.4 percent; wheat flour 13.4 percent; spice blend 11.6 percent; and coloring 0.5 percent.

The coated chicken pieces are then baked in an oven pre-heated to 350°F and are baked at that temperature for approximately 60 minutes or until done. The resulting chicken pieces have the appearance, texture and flavor of deep fat-fried chicken.

EXAMPLE II

A batter is formed as in Example I, and is then coated onto about 2½ lbs. of pork chops. The batter-coated chops are then further coated uniformly with about 100 grams of a second dry mix, consisting of the following ingredients, by weight of the mix: cereal fines 49.15 percent; pregelatinized waxy maize starch 20.32 percent; shortening 5.00 percent; wheat flour 13.55 percent; spice blend 11.65 percent; and coloring 0.33 percent.

The chops were baked in a 400°F oven until done, and possessed the appearance, texture and flavor of batter-coated, fat-fried pork chops.

As has already been pointed out by the applicants the process of this invention can also be applied to any coatable fish or vegetable where it is desired to cook fish or vegetable and impart to it a deep fat-fried appearance and flavor. The process eliminates the problems involved in the actual deep fat-frying step itself by providing just a baking step following the coating of the foodstuff. The example used is for illustrative purposes only and should not be construed to unduly narrow the scope of the process of this invention.

We claim:

1. A process for imparting to a cooked foodstuff the texture and appearance of deep fat-frying, which comprises, combining raw egg and about 2½ to 3½ ounces of milk or water with about 80 to 100 grams of a dry mix which comprises, by weight of the dry mix, 60 percent–75 percent wheat flour, 7 percent–12 percent shortening, 7 percent–12 percent cornstarch and 1½ percent–3 percent pregelatinized waxy maize starch; coating the foodstuff evenly with said batter; uniformly coating the batter coated foodstuff with a second dry mix which comprises, by weight of the dry mix, 35 percent–50 percent cereal fines, 15 percent–25 percent pregelatinized waxy maize starch, 3 percent–15 percent shortening, and 10 percent–15 percent wheat flour; and baking the foodstuff until done.

2. The process of one where the foodstuff is selected from the group consisting of meat, fowl, fish or vegetable.

* * * * *